United States Patent [19]

Okano

[11] Patent Number: 4,959,825
[45] Date of Patent: Sep. 25, 1990

[54] RECORDED INFORMATION REPRODUCING APPARATUS WITH READING AND WRITING PHASE ADJUSTMENT

[75] Inventor: Takashi Okano, Saitama, Japan

[73] Assignee: Pioneer Electronic Corporation, Tokyo, Japan

[21] Appl. No.: 209,812

[22] Filed: Jun. 22, 1988

[30] Foreign Application Priority Data

Jun. 29, 1987 [JP] Japan ................................ 62-163201

[51] Int. Cl.$^5$ ........................ H04N 5/95; G11B 20/00
[52] U.S. Cl. ..................................... 369/48; 358/337; 358/339
[58] Field of Search ............... 358/337, 339, 320, 323, 358/324, 326, 310, 338, 332, 321; 360/72.2, 72.1, 36.2, 73.03, 36.1; 369/48, 50, 59

[56] References Cited

U.S. PATENT DOCUMENTS 4,603,412 7/1986 Yamazakt ............................ 358/338
4,680,658 7/1987 Tatamt ................................ 358/320
4,688,081 8/1987 Furuhata ............................ 358/337
4,757,488 7/1988 Nagai .................................. 369/50

Primary Examiner—Robert L. Richardson
Attorney, Agent, or Firm—Sughrue, Mion, Zinn, Macpeak & Seas

[57] ABSTRACT

A recorded information reproducing apparatus, such as a video disk player, has a memory for storing video data of one field. The reproducing apparatus generates an address access detection signal when the absolute value of the difference between a generated write address and a generated read address of the memory decreases less than a predetermined value. The address access detection signal serves to change the phase difference between the synchronous signal in the read video signal and a standard synchronous signal which is synchronized with the read clock signal, thereby finely adjusting the time axis and changing the synchronization.

7 Claims, 4 Drawing Sheets

RECORDED INFORMATION REPRODUCING APPARATUS WITH READING AND WRITING PHASE ADJUSTMENT

Field of the Invention

The present invention relates to a recorded information reproducing apparatus for reproducing various information (such as, video information and sound information) recorded on a disk. a magnetic tape or other recording mediums.

Background of the Invention

A recorded information reproducing apparatus for a video disk player is known which incorporates a synchronous changing function for changing the phase and frequency of a video signal by means of a memory having a memorizing capacity for storing one field or one frame of the video signal.

Video disk players which incorporate a time axis control system are also known, wherein the time axis is roughly controlled by adjusting the rotary speed of the spindle motor driving the recording disk to thereby control the relative speed of the recording disk to the information detecting point of a pick-up for reading signals. In addition, prior art disk players are known which finely adjust the time axis, or adjust the time axis to compensate for jitter by supplying the read video signal obtained through the pick-up to a variable delay element.

FIG. 1 shows a prior art recorded information reproducing apparatus including a CCD 30 which serves as a variable delay element for correcting jitter of the video signal read from the recording medium, an A/D (analog to digital) converter 31 for generating digital data corresponding to the sample value obtained from a sampling operation of the output of the CCD 30. an image memory 32 in which the outputted data of the A/D converter 31 is sequentially written, a D/A (digital to analog) converter 33 for sequentially converting the data read from the image memory 32 to an analog signal, and a control circuit 34 for controlling the A/D converter 31, the image memory 32, and the D/A converter 33.

FIG. 2 shows another apparatus of the prior art, wherein a line memory is used as a variable delay element for finely controlling the time axis. In FIG. 2, a write clock signal which is synchronous with the change of the time axis of the read signal is produced, and the write clock signal is read by means of a read clock having a frequency which is stabilized after the read signal is written into the memory 32, according to the write clock signal. As shown in FIG. 2, an A/D converter 31, an image memory 32, a D/A converter 33, and a control circuit 34 are connected in a similar manner to that of the apparatus shown in FIG. 1. However the prior art apparatus of FIG. 2 contains a line memory 35 which is connected between the A/D converter 31 and the image memory 32.

In FIGS. 1 and 2, jitter-correction is carried out by either the CCD 30 (FIG. 1). or the line memory 35 (FIG. 2), such that the data written into the image memory 32 does not contain any jitter. As a result, in the conventional apparatus shown in FIGS. 1 and 2, the frequencies of the data writing operation and the data reading operation of the image memory 32 are identical. Therefore, it is possible to use the same frequency clock for both the writing and reading operation. In FIGS. 1 and 2, the address difference between the write address and the read address of data supplied to and from the image memory 32 does not change from the original difference, thereby eliminating the phenomena of address passing.

When a special condition for reproducing information from a CLV (constant linear velocity) disk accompanies a track jump, the write address value jumps, and consequently the difference between the write address and the read address changes. Because the operations of writing and reading into/from the image memory are carried out alternatively, and are not carried out simultaneously even when ,the address difference is zero. This condition will continue until the next track jump happens after the address difference becomes zero. Thus, the passing phenomenon cannot happen frequently. This feature above is the advantage of a system in which the image memory is written after a jitter correction, however, such systems have the disadvantage of requiring a CCD or a line memory exclusively as the elements for jitter correction.

According to another well-known conventional apparatus shown in FIG. 3, the apparatus has various members which are identical to those of the apparatus shown in FIG. 2, such as the A/D converter 31, the image memory 32, the D/A converter 33, and the control circuit 34. However the apparatus of FIG. 3 contains a delay line 36 for delaying the output of the A/D converter 31 by 1H to several Hs (where H is a horizontal interval) , and a changeover switch 37 for selectively supplying the input or the output of the delay line 36 to the image memory 32, resulting in the simultaneous operations of jitter correction and synchronized change carried on in the image memory.

In the conventional apparatus shoWn in FIG. 3, because the write clock signal used when a video signal is written into the image memory 32 is written is simultaneously with the video signal having jitter, the frequency of the write clock signal at this instance is not identical with that of the read clock signal. More particularly, the writing frequency often increases or decreases relative to the frequency of the reading operation. When the difference between the write address and the read address decreases, a passing phenomenon due to jitter frequently occurs, whereby one address passes pass the other address. When the memory capacity of the image memory 32 cannot store data for more than one field, a vertical shift of ½ of a line of the image. and thinning or overlapping of the image are apt to happen, resulting in an ugly or undesirable display of the images.

According to the particular construction of the image memory 2, an address accessing prevents the image memory from being properly read, generating noise.

In order to solve the above problems, a changeover switch 37 and a delay line 36 of 1H to several Hs of delayed time are employed in the conventional system of FIG. 3. The changeover switch 37 is adapted to changeover when the addresses are accessed in order to produce time advancement or delay of 1H to several Hs. As a result, the write address changes by an amount corresponding to the time amount advanced or delayed, and two addresses can be sufficiently separated, preventing the passing phenomenon from occurring. In the conventional apparatus of FIG. 3, neither a line memory nor a CCD for correcting the jitter is necessary. However, a delay line and a changeover switch are necessary to prevent the address passing phenomenon from occurring, thereby resulting in a bulky construction of the circuitry used in the apparatus of FIG. 3.

Summary of the Invention

The present invention has been designed in order to solve the above problems of the prior art.

It is a general object of the present invention to provide a recorded information reproducing apparatus having a simple construction, and which provides jitter correction and synchronous change.

It is a specific object of the present invention to provide a recorded information reproducing apparatus for generating an address access detection signal when the absolute value of the difference between the write address and the read address of the memory decreases to lower than a predetermined value. The address access detection signal is generated in order to change the phase difference between a synchronizing signal contained within the read signal read from the recording medium and a standard synchronizing signal which is synchronized with the read clock signal supplied to the memory.

Description of the Preferred Embodiments

Figure 1:
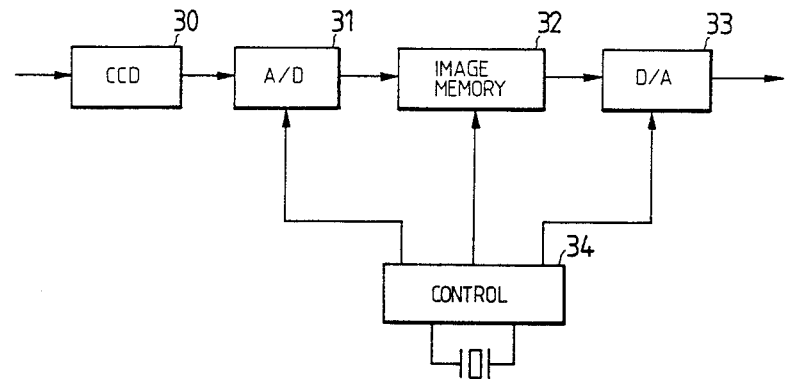
FIGS. 1–3 show block diagrams of the recorded information reproducing devices of the prior art.
Figure 2:
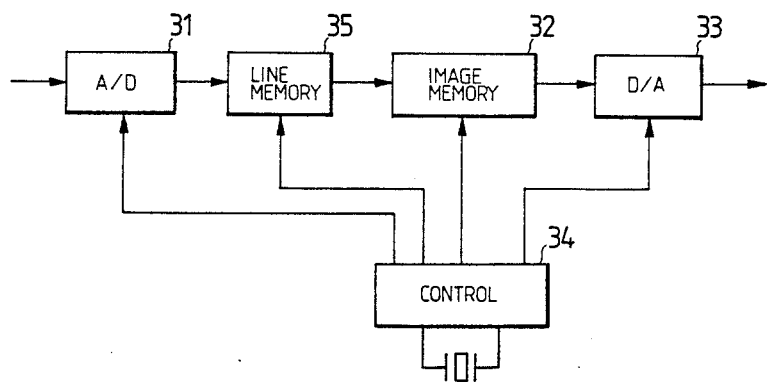
Figure 3:
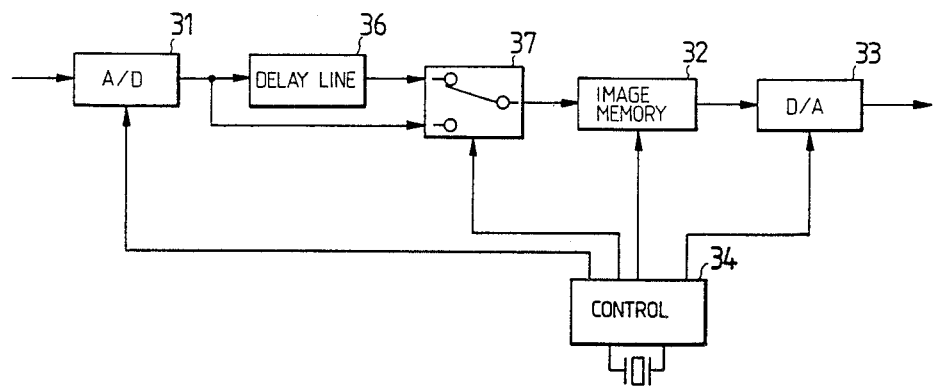
Figure 5:
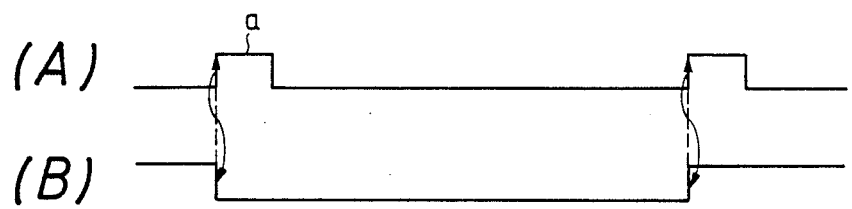
FIGS. 5(A) and 5(B) are wave diagrams showing the operation of various members included in the embodiment of FIG. 4.

The first embodiment of the recorded information reproducing apparatus according to the present invention will now be described in detail with reference to FIGS. 4–5.

Figure 4:
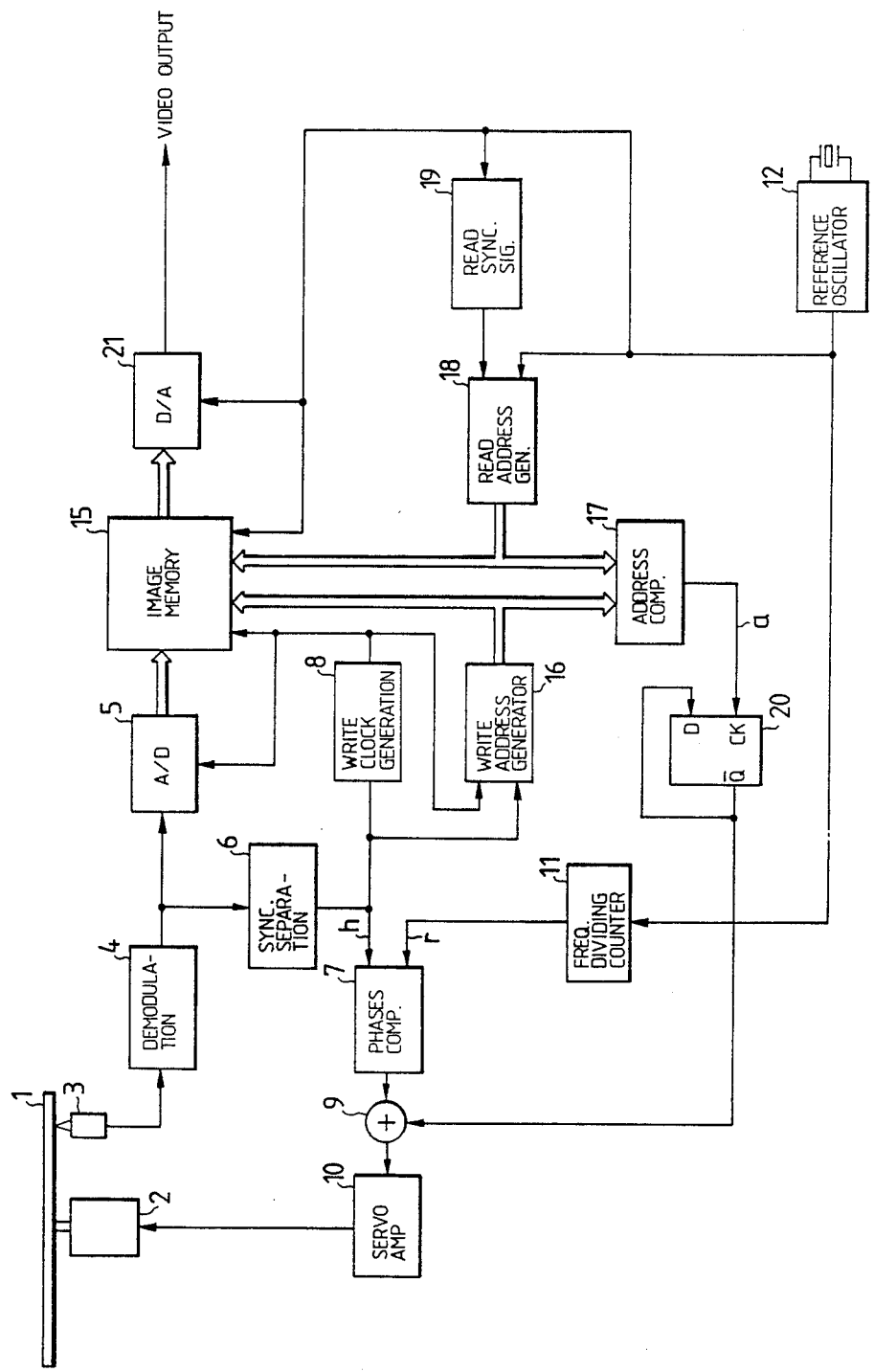
FIG. 4 is a block diagram showing one embodiment of the present invention

In FIG. 4, a disk 1 is rotatably driven by a spindle motor 2. A pick-up 3 reads the disk 1 to pick-up a RF (high frequency) signal having video information and the like recorded on the disk 1. The RF signal read by the pick-up 3 is supplied to a demodulation circuit 4 consisting of a FM demodulator and the like. The video signal is demodulated by the demodulation circuit 4, and the demodulated signal is supplied to an A/D (analog to digital) converter 5 and to a synchronous separation circuit 6. The separation circuit 6 separates a reproduction horizontal synchronizing signal (h) contained within the demodulated video signal. The reproduction horizontal synchronizing signal (h) output from the synchronous separation circuit 6 is supplied to a phase comparison circuit 7, to a write clock signal generating circuit 8, and to a write address generator 16. In the phase comparison circuit 7, the phase of the reproduction horizontal synchronizing signal (h) is compared with a standard horizontal synchronizing signal (r) having a predetermined frequency to thereby generate a phase difference detecting signal according to the phase difference therebetween. The phase difference detection signal passes through an addition circuit 9 and is supplied to a spindle motor 2 through a servo amplifier 10. The phase difference detecting signal serves as a spindle error signal in order to control the rotational speed of the disk 1. The standard horizontal synchronizing signal. (r) is generated from a frequency dividing counter 11. A standard oscillator 12 oscillates at a frequency equal to N (a natural number) times the frequency (fH) of a reference horizontal synchronizing signal to thereby supply a standard signal to the frequency dividing counter 11. The frequency dividing counter 11 divides the frequency of the standard signal by N to output a signal equal to 1/N times the frequency generated by oscillator 12, thereby generating a standard horizontal synchronous signal (r).

The write clock signal generating circuit 8 generates a write clock of a frequency equal to N times the reproduction horizontal synchronizing signal (h). The write clock output from the write clock generating circuit 8 is supplied to an image memory 15, to an A/D converter 5 and to a write address generating circuit 16.

In the A/D converter 5, a sampling of the video signal is carried out using the write clock signal to generate a digital signal according to the resultant sample value. The outputted data from the A/D converter 5 is supplied to the image memory 15. A vertical and a horizontal synchronizing signal separated in the synchronizing separation circuit 6 are supplied to the write address generating circuit 16. The write address generating circuit 16 consists of a first counter which is reset by, for example, a horizontal synchronizing signal; and generates count data which becomes a lower unit of the address data and a second counter which is designed to be reset by a vertical synchronizing signal in order to generate the count data of an upper unit of the address data. The output of the write address generating circuit 16 is supplied to the image memory 15 as a write address data for controlling the write address, and is also supplied to an address comparison circuit 17.

The image memory 15 has a memory capacity equal to one field. The read address of the image memory is controlled by a read address data signal output from a read address generating circuit 18. The read address generating circuit has a construction which is similar to that of the write address generating circuit 16. The outputs of the standard oscillator 12 and the read synchronizing signal generating circuit 19 are supplied to the read, address generating circuit 18. The read synchronizing signal generating circuit 19 is designed such that it divides the outputted frequency of the standard oscillator 12 in order to generate two synchronizing signals having the identical frequency as that of a standard vertical synchronizing signal and that of the standard horizontal synchronizing signal, respectively. The read address data outputted from the read address generating circuit 18 is supplied to the image memory 15 and to the address comparison circuit 17 where the read address is compared with the write address data. When the absolute value of the difference between the write address data and the read address data decreases to lower than a predetermined value, the address comparison circuit 17 outputs an address access detection signal (a) of a high level. The address access detection signal (a) outputted from the address comparison circuit 17 is supplied, to a clock input terminal of a D type flip flop 20. The $\overline{Q}$ outputs are supplied to an input terminal D of the D type flip flop 20. The $\overline{Q}$ output from the D type flip flop 20, is also supplied to the addition circuit 9 where the $\overline{Q}$ output is added to the output of the phase comparison circuit 7.

The output of the standard oscillator 12 is supplied to the image memory 15 as a read clock and to the D/A converter 21 as a sampling clock. Simultaneously, the data read out from the image memory 15 is supplied to the D/A converter 21. The data read out from the image memory 15 is supplied to a D/A converter 21 which converts the read out digital data to an analog signal. Thus, the D/A converter 21 outputs a reproduction video signal.

When the write address of the image memory 15 accesses to the read address of the image memory 15, and the absolute value of the difference between the write address and the read address is less than a predetermined value, the address comparison circuit 17 outputs an address access detection signal (a) of a high level as shown in FIG. 5(A). Because the D type flip flop 20 inverts at the instant of the address access detection signal (a), the output $\overline{Q}$ of the D type flip flop 20 becomes a signal which inverts every time the address access detection signal (a) is generated, as shown in FIG. 5(B) i.e., the output voltage of the flip flop 20 will vary between high and low values as shown in FIG. 5(B). The output $\overline{Q}$ of the D type flip flop 20 is added to the spindle error signal, so that every time the output $\overline{Q}$ of the D type flip flop 20 inverts the offset of the spindle servo loop changes, resulting in a change of the synchronizing phase of the rotation of the spindle motor 2 relative to the standard horizontal synchronizing signal (r). As a result the phase difference between the reproduction horizontal synchronizing signal (h) and the standard horizontal synchronous signal (r) changes.

In consequence, because the standard horizontal synchronizing signal (r) is generated by dividing the frequency of the standard signal from the standard oscillator 12, the write address in the image memory 15 changes relative to the read address, preventing any accessing of the address.

Because the changing direction of the offsetting is inverted every time the address accesses, the value of the offsetting cannot pass over a dynamic range of the spindle servo loop. resulting in a stable operation of the apparatus. The write address can be sufficiently advanced or delayed from the read address by a suitable addressing value when an advance or delay occurs, and as a result, there is no frequent happening of passing phenomena owing to jitter until an address accessing is again generated.

The CLV disk has a possibility of accessing of the address due to a track jump operation occurring in the above-mentioned special reproducing operation. However, considering that the largest amplitude of the jitter is 30 msp-p, which is about one-half of 1H and one field is 262.5H, it is only when the address difference decreases less than 1H that some counter plan to address accessing is necessary. In this case, it may be presumed that the probability of generating control signal (a) due to the track jump operation is 1/262. As a result, the generation of the control signal (a) sufficiently decreases the chance of a vertical shift of ½ line of the image at the read side of the image memory 15, and thinning out of a field or overlapping of fields.

The wider the phase comparison range of the phase comparison circuit 7 according to the present invention becomes, the larger the moving distance of the synchronous phase becomes.

Figure 6:
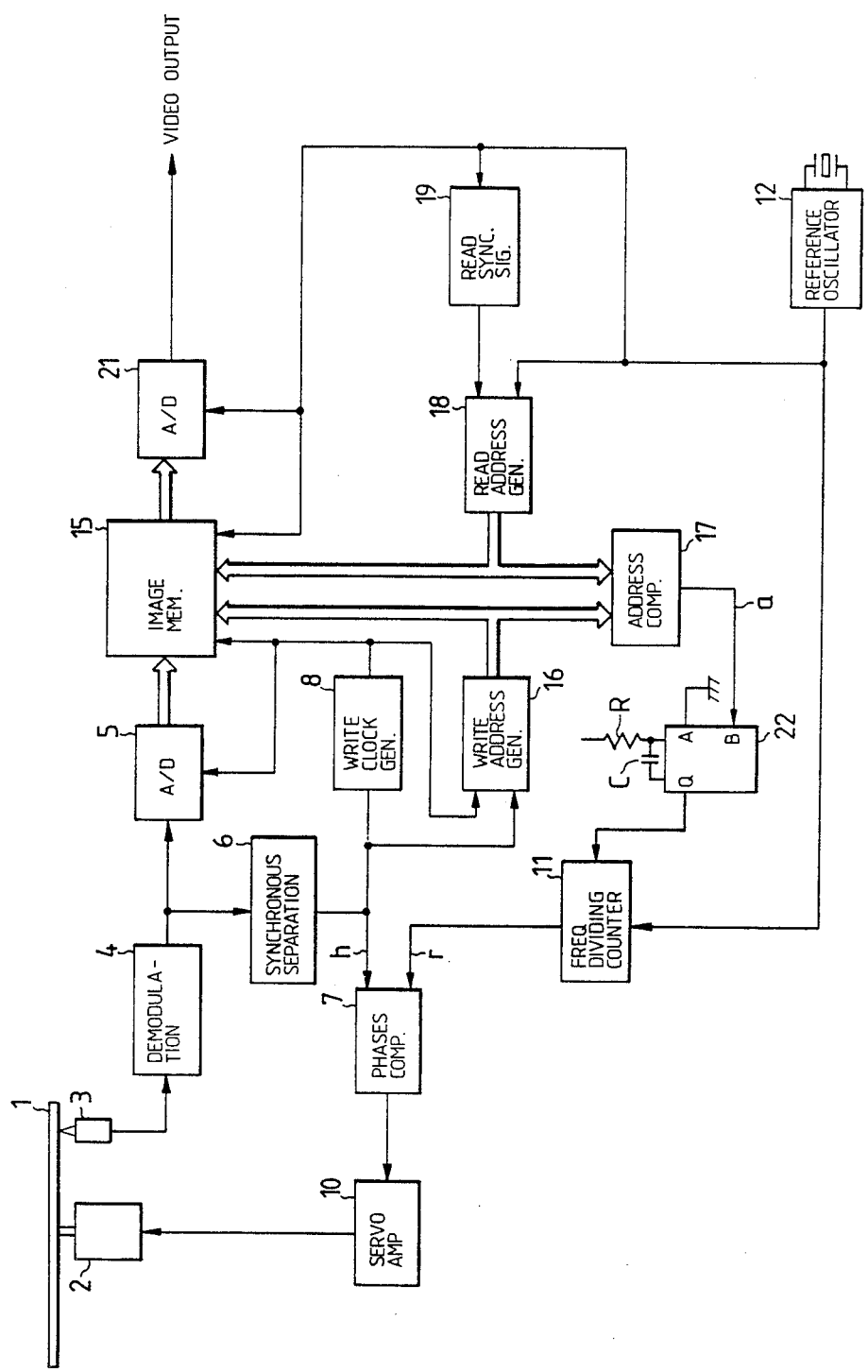
FIG. 6 is a block diagram showing another embodiment of the present invention.

FIG. 6 shows a second embodiment of the present invention, wherein various components of FIG. 6, such as a record disk 1, a spindle motor 2, a pick-up 3, a demodulation circuit 4, and A/D converter 5, a synchronous separation circuit 6, a phase comparison circuit 7, a write clock generating circuit 8, a servo amplifier 10, a frequency dividing counter 11, a standard oscillator 12, an image memory 15, a write address generating circuit 16, an address comparison circuit 17, a read address generating circuit 18, a read synchronizing signal generating circuit 19, and a D/A converter 21 are connected as shown in FIG. 4, except that the address access detection signal (a) output from the address comparison circuit 17 is supplied to a trigger input terminal of a monostable multivibrator 22. An output Q of the monostable multivibrator is supplied to the frequency division counter 11. The frequency division counter 11 is designed such that it stops frequency dividing the signal supplied from the oscillator 12 when the output Q from the monostable multivibrator 22 is at a high level.

Figure 7:
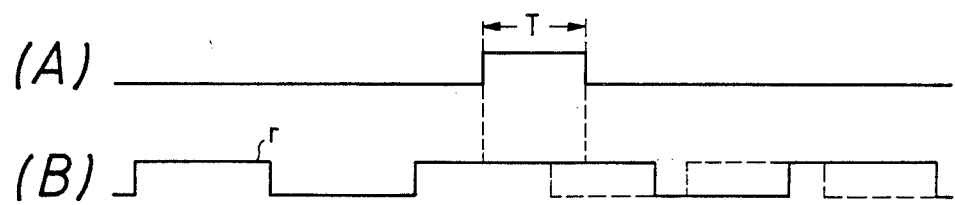
FIGS. 7(A) and 7(B) are wave diagrams showing the operation of various members of the apparatus according to the embodiment of FIG. 6.

According to the second embodiment of the present invention, when an address access detection signal (a) is generated, the output Q of the monostable multivibrator 22 is kept at a high level for the period T which is determined according to the time setting capacitor C and a resistor R of the monostable multivibrator 22, as shown in FIG. 7(A). Consequently, the phase of the standard horizontal synchronizing signal (r) output from the frequency dividing counter 11 changes, as shown in FIG. 7(B). When the phase of the standard horizontal synchronizing signal (r) changes, the phase angle of the spindle motor 2 changes, so that the phase difference between the reproduction horizontal synchronizing signal (h) and the standard horizontal synchronizing signal (r) contained in the video signal read by the pickup 3 also changes, thereby resulting in an operation similar to that of the apparatus of FIG. 4.

Instead of the output Q of the monostable multivibrator 22 being supplied to the frequency division counter 11, it may be supplied to the read synchronizing signal generating circuit 19 in order to stop a frequency dividing operation in the read synchronizing signal generating circuit 19 for the time duration T or preset or reset the frequency division counter, resulting in a phase shift of the output of the read synchronizing signal generating circuit 19 and a change of the read address from the memory 15.

It is preferable to select or determine the change of the address by multiplying an integral number and the image horizontal period together, since the horizontal synchronization of the read image signal cannot be disturbed due to the preferable selection. When the address is changed by multiplying an integral number and two horizontal periods together in the case of a NTSC signal, it is possible to prevent a color synchronization from being disturbed.

The address comparison circuit 17 is used as an address access detection means in the embodiments described above' however, it is possible to employ any means as the address access detection means, such as a circuit constructed so as to compare the synchronizing phase of the input image signal with that of the output image signal in order to generate an address access detection signal according to the phase difference between the synchronizing signals in both the input and output signals.

According to the construction of the recorded information reproducing apparatus of the present invention, the time axis is finely adjusted and synchronous changed, so that when the absolute value of a difference between the write address and read address of the memory decreases to lower than a predetermined value, an address access detection signal is generated, resulting in a change in the phase difference between the synchronizing signal contained in the read signal of a recording medium and the standard synchronizing signal which is synchronized with the read clock signal supplied to the memory. As a result, it is not necessary to additionally install a delay line and a changeover switch in the apparatus to prevent a passing phenomenon of the write address and the read address from occurring, resulting in a recorded information reproducing apparatus which has a relatively simple construction, and which corrects jitter and performs synchronizing change of a video signal read from a recording medium.

What is claimed is:

1. A reproducing apparatus for reproducing information recorded on a recording medium comprising:
    means for reading information recorded on the recording medium;
    separation means for separating a synchronizing signal contained within the read information;
    means for generating a reference synchronizing signal;
    means for comparing a phase of the synchronizing signal separated by said separation means with a phase of the reference synchronizing signal, and for generating an error signal which represents a phase difference therebetween;
    memory means, coupled to said reading means, for storing and reading the information read from the recording medium;
    means for generating a write clock signal in phase synchronous with said synchronizing signal;
    means for generating a write address signal in response to said write clock signal;
    means for generating a read address signal for said memory means in response to said generated reference synchronizing signal;
    address comparing means for comparing the generated write and read addresses, said address comparing means being operable for generating a control signal when the absolute value of the difference between the generated write and read addresses is less than a predetermined value;
    adding means for adding an offset signal to said error signal;
    voltage varying means for varying a voltage of said offset signal in response to said control signal;
    means for driving the recording medium according to an output of said adding means; and
    means for reading the information written into said memory means.

2. The reproducing apparatus of claim 1, wherein aid voltage varying means inverts said offset signal in response to said control signal.

3. The reproducing apparatus of claim 2, wherein said voltage varying means comprises a D type flip-flop, said flip-flop having an output which is inverted in response to said control signal.

4. A reproducing apparatus for reproducing information recorded on a recording medium comprising:
    means for reading information recorded on the recording medium;
    separation means for separating a synchronizing signal contained within the read information;
    means for generating a reference synchronizing signal separated by said separation means with a phase of the reference synchronizing signal, and for generating an error signal which represents a phase difference therebetween;
    memory means, coupled to said reading means, for storing and reading the information read from the recording medium;
    means for generating a write clock signal in phase synchronous with said synchronizing signal;
    means for generating a write address signal in response to said write clock signal;
    means for generating a read address signal for said memory means according to said generated reference synchronizing signal;
    address comparing means for comparing the generated write and read addresses, said address comparing means being operable for generating a control signal when the absolute value of the difference between the generated write and read addresses is less than a predetermined value;
    phase shifting means for shifting the phase, without changing the frequency, of said reference synchronizing signal supplied to said phase comparing means in response to said control signal; and
    means for reading the information written into said memory means.

5. The reproducing apparatus of claim 4, wherein said phase shifting means is operable for shifting the phase of the reference synchronizing signal supplied to said phase comparing means for a predetermined period in response to the control signal.

6. The reproducing apparatus of claim 4, wherein said means for generating a reference synchronizing signal comprises a reference oscillator, and a frequency dividing counter for receiving an output of said reference oscillator.

7. A reproducing apparatus for reproducing information recorded on a recording medium comprising:
    means for reading information recorded on the recording medium;
    separation means for separating a synchronizing signal contained within the read information;
    means for generating a reference synchronizing signal, including a reference oscillator and a frequency dividing counter for receiving an output of said reference oscillator;
    means for comparing a phase of the synchronizing signal separated by said separation means with a phase of the reference synchronizing signal, and for generating an error signal which represents a phase difference therebetween;
    memory means, coupled to said reading means, for storing and reading the information read from the recording medium;
    means for generating a write clock signal in phase synchronous with said synchronizing signal;
    means for generating a write address signal in response to said write clock signal;
    means for generating a read address signal for said memory means according to said generated reference synchronizing signal;
    address comparing means for comparing the generated write and read addresses, said address comparing means being operable for generating a control signal when the absolute value of the difference between the generated write and read addresses is less than a predetermined value;
    phase shifting means for shifting the phase of said reference synchronizing signal supplied to said phase comparing means in response to said control signal, said phase shifting means comprising a monostable multivibrator for receiving the control signal, and for generating an output signal in response thereto, the output signal being supplied to said frequency dividing counter for a predetermined period such that said frequency dividing counter stops frequency dividing the signal from said reference oscillator in response to the output signal, thereby shifting the phase of the reference synchronizing signal for the predetermined period; and means for reading the information written into said memory means.

* * * * *